Aug. 27, 1968   N. O. OLSSON   3,398,983
IMPLEMENT MOUNTING MECHANISM
Filed Sept. 16, 1966
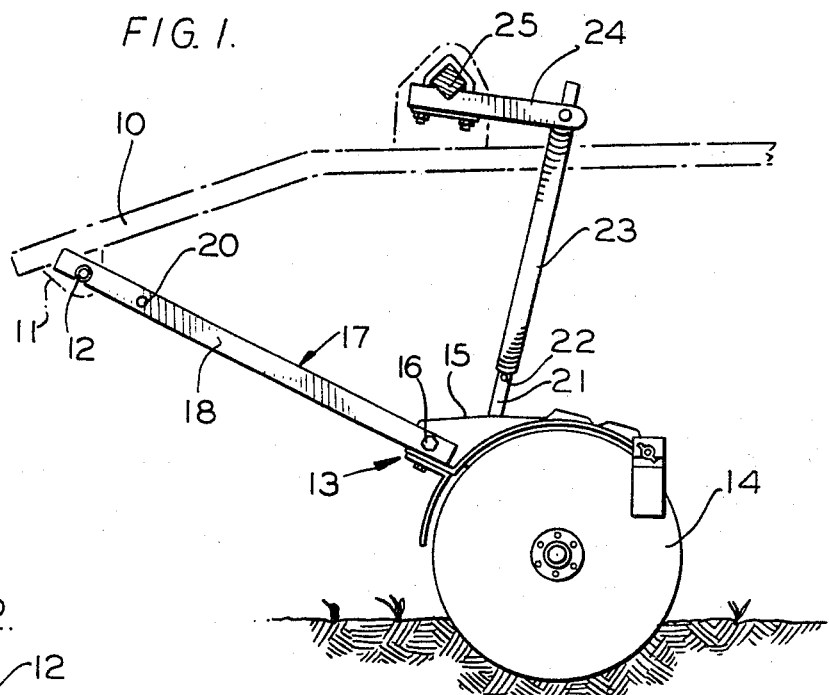
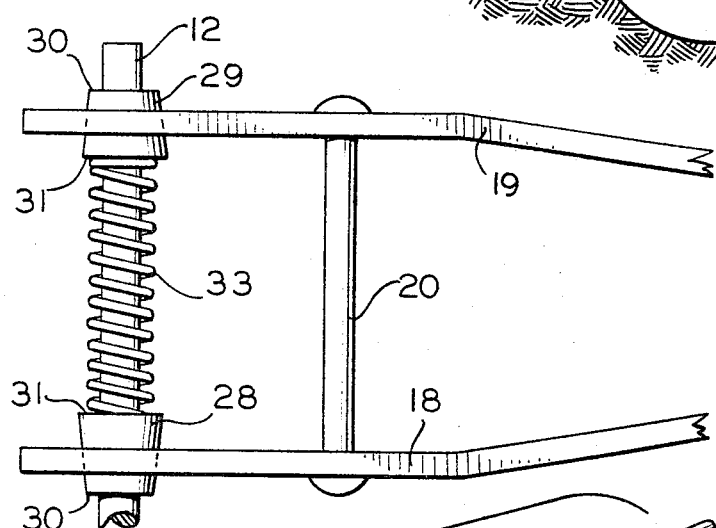
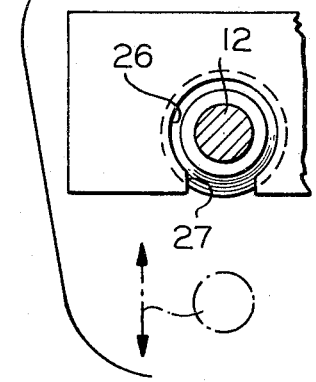
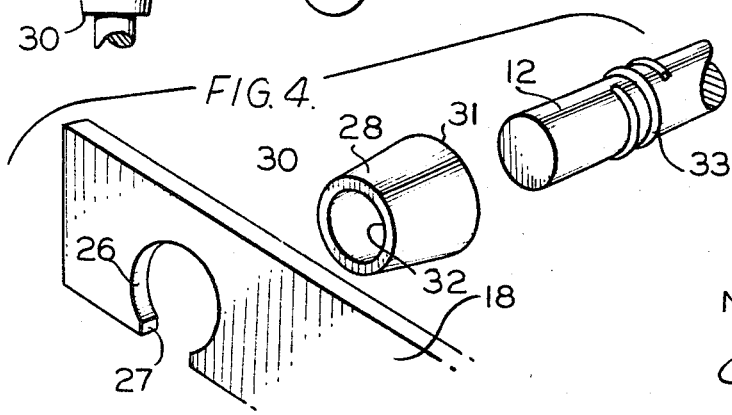
INVENTOR
NILS O. OLSSON
ATT'Y United States Patent Office 3,398,983
Patented Aug. 27, 1968

3,398,983
IMPLEMENT MOUNTING MECHANISM
Nils O. Olsson, Ancaster, Ontario, Canada, assignor to International Harvester Company, Chicago, Ill., a corporation of Delaware
Filed Sept. 16, 1966, Ser. No. 579,940
2 Claims. (Cl. 287—189.36)

ABSTRACT OF THE DISCLOSURE

Quick attaching means for mounting the spaced drag links of a grain drill furrow opener on a supporting frame, consisting of an opening formed in each of the links having restricted entities for the reception of a shaft on which is slidably mounted a tapered sleeve or insert for each opening. These small ends of the tapered sleeve are directed outwardly and the sleeves wedge into the openings, a spring surrounding the middle of the shaft having its ends engageable with the inserts to hold them in the openings.

---

This invention relates to means for mounting implements on a supporting frame, and particularly concerns means facilitating the assembly and disassembly of a plurality of earth-working devices.

In an implement such as a grain drill wherein a plurality of relatively closely spaced furrow forming units are arranged transversely on a supporting frame for vertical movement relative thereto. Each furrow forming unit usually consists of a drag link or links carrying a furrow former such as a pair of discs at its rear end. The forward end of the link includes a pair of laterally spaced attaching elements having aligned openings therein for pivotal connection to a frame member to accommodate vertical swinging of the unit, as between operating and transport positions. The frame member may be in the form of a shaft or bar extending the entire width of the machine and upon which all of the furrow forming units are mounted. Assembly of the units on the frame member has required one or more operators to arrange the furrow forming units in a side-by-side relationship and then to thread one end of the shaft or bar axially through the openings in the forward ends of the drag links until all of the units are mounted on the shaft. The shaft is then mounted on the implement frame. Such an assembly procedure is difficult and time consuming, and to remove a centrally disposed unit for repairs or replacement is equally tedious. The present invention contemplates and has for its object the provision of novel means for mounting the earthworking units of a grain drill or the like on a transverse frame bar or shaft whereby each of said units may be quickly attached to or removed at will from the transverse shaft without disturbing the other units. This is accomplished by providing an entrant recess in the lower edges of the drag links having a width less than the diameter of the opening, communicating with the shaft openings so that the shaft may be received in the aligned openings. The drag links of each unit are releasably retained on the shaft by the provision of a pair of tapered inserts slidable on the shaft between the attaching elements of the drag links with the small ends of the inserts facing outwardly. The ends of a compression spring surrounding and slidable on the shaft between the inserts engage the larger ends of the latter and urge them outwardly. The diameter of the small end of the insert is less and the larger end is greater than the diameter of the opening so that the spring causes both inserts to wedge into the associated openings in the drag links.

Disassembly of a furrow forming unit from the shaft is accomplished by grasping the two inserts and sliding them inwardly against the compression of the spring, allowing the furrow forming unit to be lifted from the shaft, the latter passing radially through the recesses in the links.

Other objects and advantages of the invention will become clear from the following detailed description when read in conjunction with the accompanying drawings wherein:

FIGURE 1 is a diagrammatic view in side elevation showing one furrow forming unit of a multiunit grain drill or the like, partly in section;

FIGURE 2 is an enlarged plan view of a detail showing a portion of the structure of FIGURE 1;

FIGURE 3 is an enlarged sectional view in side elevation of a portion of the structure shown in FIGURE 1; and FIGURE 4 is an exploded view of a detail in perspective and on an enlarged scale of a portion of the mounting means of this invention.

In the drawings the numeral 10 indicates a portion of the supporting frame of a grain drill of any well-known construction which it may be understood is elongated transversely of the direction of travel and is provided with one or more lugs 11 adapted to rotatably support an elongated pivot shaft 12.

A typical earth-working tool with which this invention is associated is the furrow opener unit 13 comprising conventional disk means 14 mounted on a boot structure 15 pivotally connected by a bolt 16 to the rear end of a drawbar 17 comprising laterally spaced, rearwardly converging drawbar elements 18 and 19 connected near their forward ends by a spacer bolt 20.

Means by which the furrow opener unit is raised and lowered is indicated in FIGURE 1 as including a lift link 21 carrying a cotter pin 22 and surrounded by a spring 23 abutting the cotter at one end and at its other end a lift arm 24 mounted on a rock shaft 25 carried by the implement frame and rocked by any suitable power transmission means, not shown, and well-known in the art.

The furrow opener unit 13 is one of a plurality of such units laterally spaced along the implement frame 10 and each unit is adapted to be connected in draft receiving relation to the pivot shaft 12, it being understood that the implement is provided with hitch means, not shown, for connection of the implement to a draft source such as a tractor.

Drawbar elements 18 and 19 are provided with aligned openings 26 of a diameter greater than that of shaft 12 and en entrant recess 27 in the lower edge of each drawbar element 18 and forming with opening 26 a keyhole slot wherein the entrant recess 27 is wider than the diameter of the shaft 12 to receive the latter for disposition in openings 26. The drawbar elements 18 and 19 are firmly seated and pivotally mounted on shaft 12 by means accommodating quick attachment and removal of the furrow opener units, this means comprising inserts 28 and 29 in the form of tapered, frusto-conical spacers the small ends 30 of which are of lesser diameter than openings 26, the larger ends 31 being of greater diameter than said openings.

The inserts 28 and 29 are tubular, being provided with axial bore 32 pivotally receiving axle 12. Surrounding the axle between inserts 28 and 29 is a compression spring 33 abutting the large ends 31 of the inserts and yieldably forcing them into the openings 26.

The furrow opener unit 13 is easily and quickly removed from the pivot shaft 12 by pressing the inserts 28 and 29 inwardly against the tension in spring 33 to release the inserts from the openings, at which time the drawbar 17 may be lifted from the pivot shaft 12.

For reassembly the reverse procedure is followed, the inserts 28 and 29 being pressed inwardly against the action of the spring until the drawbar elements 18 and 19 can be dropped upon shaft 12 for reception of the latter in the openings 26. The inserts 28 and 29 are then released so that they enter the openings 26.

It is believed that the construction and operation of the novel impdement mounting mechanism of this invention will be clearly understood from the foregoing description. It should likewise be understood that the invention has been described in its preferred embodiment and that modifications may be made therein without departing from the spirit of the invention or the scope of the appended claims.

What is claimed is:

1. A mounting assembly for implements and the like comprising, a transverse shaft, laterally spaced elements having transversely aligned openings to receive said shaft, each of said openings having an entrant recess of a width less than the diameter of said opening and greater than the diameter of said shaft to accommodate passage of said shaft through said recesses into said openings, a pair of spaced tubular inserts mounted on and slidably receiving said shaft between said elements, each of said inserts having a portion of lesser diameter than said openings directed outwardly to be received therein and a portion of greater diameter, and spring means disposed between said elements and operatively engageable with said inserts for yieldably holding said inserts in said openings.

2. A mounting assembly for implements and the like comprising, a transverse shaft, laterally spaced elements having transversely aligned openings to receive said shaft, each of said openings having an entrant recess of a width less than the diameter of said opening and greater than the diameter of said shaft to accommodate passage of said shaft through said recesses into said openings, a pair of spaced tubular inserts mounted on and receiving said shaft, each of said inserts having a portion of lesser diameter than said openings to be received therein and a portion of greater diameter, and means yieldably holding said inserts in said openings, said inserts being tapered with their small ends facing outwardly of said elements and said means yieldably holding said inserts in said openings being a compression spring the ends of which operatively engage the larger ends of said tapered inserts and urge the latter outwardly.

References Cited

UNITED STATES PATENTS

| 1,357,049 | 10/1920 | Hartsock | 280—504 |
| 2,271,699 | 2/1942 | Magnan | 280—515 |

FOREIGN PATENTS

| 1,020,473 | 12/1957 | Germany. |
| 1,113,638 | 9/1961 | Germany. |

EDWARD C. ALLEN, *Primary Examiner.*

R. S. BRITTS, *Assistant Examiner.*